(12) United States Patent
Ur et al.

(10) Patent No.: US 9,747,924 B2
(45) Date of Patent: Aug. 29, 2017

(54) SOUND VERIFICATION (71) Applicant: Empire Technology Development LLC, Wilmington, DE (US)

(72) Inventors: Shmuel Ur, Galil (IL); Ariel Fligler, Hod-Hasharon (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 187 days.

(21) Appl. No.: 14/440,236

(22) PCT Filed: Apr. 8, 2014

(86) PCT No.: PCT/US2014/033316
§ 371 (c)(1),
(2) Date: May 1, 2015

(87) PCT Pub. No.: WO2015/156775
PCT Pub. Date: Oct. 15, 2015

(65) Prior Publication Data
US 2016/0293180 A1 Oct. 6, 2016

(51) Int. Cl.
G10L 21/0364 (2013.01)
H04R 3/00 (2006.01)
H04R 29/00 (2006.01)
G10L 15/26 (2006.01)
G10L 25/51 (2013.01)
H04R 1/10 (2006.01)

(52) U.S. Cl.
CPC .......... *G10L 21/0364* (2013.01); *G10L 15/26* (2013.01); *G10L 25/51* (2013.01); *H04R 3/002* (2013.01); *H04R 29/00* (2013.01); *H04R 1/10* (2013.01); *H04R 2430/01* (2013.01)

(58) Field of Classification Search
None
See application file for complete search history.

(56) References Cited

U.S. PATENT DOCUMENTS

| | | | |
|---|---|---|---|
| 5,386,478 A | 1/1995 | Plunkett | |
| 5,778,077 A | 7/1998 | Davidson | |
| 6,169,807 B1 | 1/2001 | Sansur | |
| 7,110,558 B1 | 9/2006 | Elliott | |
| 8,699,723 B2 * | 4/2014 | Fried | H03G 3/32 381/104 |

(Continued)

OTHER PUBLICATIONS

Chintalapudi, K.K. et al., "Ad-Hoc Localization Using Ranging and Sectoring," Twenty-third AnnualJoint Conference of the IEEE Computer and Communications Infocom, vol. 4, pp. 2662-2672 (Mar. 7-11, 2004).

(Continued)

*Primary Examiner* — Paul Huber
(74) *Attorney, Agent, or Firm* — Brundidge & Stanger, P.C.

(57) ABSTRACT

In some examples, sound verification may include a speaker device that may be configured to transmit sound at a dynamic volume level and a listening device that may be configured to receive the sound and provide feedback to the speaker device based on the received sound. The primary transceiver device may be further configured to adjust the dynamic volume level based on the feedback provided by the secondary transceiver device.

18 Claims, 6 Drawing Sheets

(56) References Cited

U.S. PATENT DOCUMENTS

2010/0008488 A1     1/2010    Bear et al.
2010/0119093 A1     5/2010    Uzuanis et al.
2012/0288107 A1   11/2012    Lamm et al.
2013/0030800 A1     1/2013    Tracey et al.

OTHER PUBLICATIONS

International Search with Written Opinion for International Application No. PCT/US2014/033316 mailed on Nov. 13, 2014.
Lane, N.D., et al., "A Survey of Mobile Phone Sensing," IEEE Communications Magazine, vol. 48, Issue 9, pp. 140-151 (Sep. 2010).
Oosterom, J.A., "Intelligibility Based Automatic Volume Control for Public Address Systems," Thesis, Embedded Systems, pp. 57 (Jul. 5, 2011).

* cited by examiner

SOUND VERIFICATION

CROSS-REFERENCE TO RELATED APPLICATION

This Application is the U.S. National Stage filing under 35 U.S.C. §371 of International Application Ser. No. PCT/US14/33316, filed on Apr. 8, 2014. The disclosure of the International Application is hereby incorporated herein by reference in its entirety.

TECHNICAL FIELD

The embodiments described herein pertain generally to verifying the quality of media transmission, including sound transmission.

BACKGROUND

Unless otherwise indicated herein, the approaches described in this section are not prior art to the claims in this application and are not admitted to be prior art by inclusion in this section.

Acoustics in open forums may be unpredictable. For example, in an outdoor setting, weather conditions such as wind, cloud cover, and even precipitation may influence how well sound transmitted from a speaker device is heard by one or more persons in a listening audience. As another example, in an indoor setting, conditions such as room size, audience size, furnishings (e.g., size and/or placement), and even the building materials for the walls may affect how well sound from the speaker device may be heard by one or more persons in the listening audience.

SUMMARY

In one example embodiment, a sound verification system may include: a speaker device that is configured to transmit sound at a dynamic volume level; and a listening device that is configured to receive the sound and provide feedback to the speaker device based on the received sound, wherein the speaker device is further configured to adjust the dynamic volume level based on the feedback provided by the listening device.

In another example embodiment, another sound verification system may include: a primary transceiver device that is configured to: transmit sound signals, and convert the sound signals into a primary text version of the transmitted sound signals; the sound verification system may also include a secondary transceiver device that is configured to: receive the sound signals transmitted by the primary transceiver device, convert the received sound signals into a secondary text version of the received sound signals, and transmit the secondary text version of the received sound signals to the primary transceiver device.

In yet another example embodiment, a method to verify audio transmission may include a primary device: transmitting audio signals at an initial volume; converting the audio signals into a source text; receiving, respectively from one or more secondary devices, secondary text converted from the transmitted audio signals; comparing the source text to the secondary text received from each of the one or more secondary devices; and adjusting a volume applied to the transmitting based on a result of the comparing.

In still another example embodiment, a non-transitory computer-readable medium may be configured to store instructions that, when executed, cause one or more processors to perform operations that include: transmit media signals; store a text version of the media signals; receive, respectively from one or more secondary devices, secondary text converted from the transmitted media signals; compare the stored text version of the media signals to the secondary text received from each of the one or more secondary devices; and adjust an intensity applied to a continued transmitting of the media signals based on a comparison result.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

There are many settings, both outdoor and indoor, in which sound may be disseminated to a listening audience. For example, a person may speak or even sing into a microphone to electronically generate sounds that may be transmitted to a listening audience via one or more speakers. Non-limiting examples of settings for such electronic dissemination of generated sound may include, but not be limited to, conference rooms, auditoriums, indoor arenas, outdoor stadiums, public squares or forums, airports, train stations, bus stations, walking or mobile tours of college or corporate campuses, walking or mobile tours of museums, parade routes, etc. However, because acoustics in such settings may vary for reasons ranging, as non-limiting examples, from weather to audience size to building materials, the embodiments described herein may enable listener feedback to facilitate dynamic volume adjustments in the electronic dissemination of the generated sound.

Figure 1:
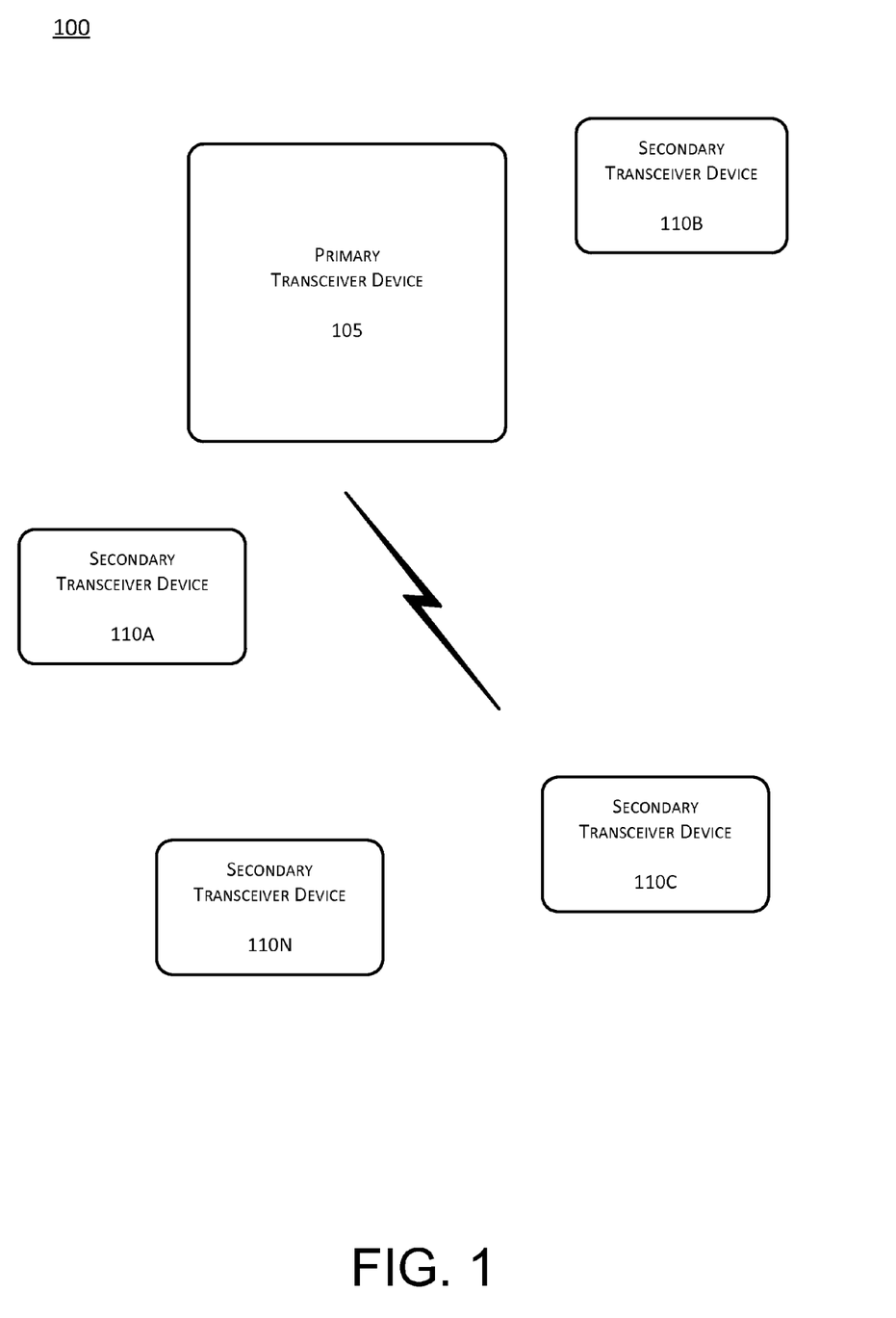
FIG. 1 shows an example configuration of a system by which sound verification may be implemented, arranged in accordance with at least some embodiments described herein.

FIG. 1 shows an example configuration of a system 100 by which sound verification may be implemented, arranged in accordance with at least some embodiments described herein. Non-limiting examples of system 100 may be configured in a conference room, an auditorium, an indoor arena, an outdoor stadium, a public squares or forum, airports, train stations, bus stations, a college or corporate campus, a museum, a parade route, etc. As depicted, FIG. 1 shows primary transceiver device 105, e.g., a speaker device 105, and secondary transceiver devices 110A-110N, e.g., listening devices 110A-110N. Unless context of an embodiment requires specific reference to one or more of secondary transceiver devices 110A-110N, e.g., listening devices 110A-110N, individual reference may be made to representative "secondary transceiver device 110 e.g., listening device 110" and corporate reference may be made to collective "secondary transceiver devices 110 e.g., listening devices 110." Although FIG. 1 shows four representations of secondary transceiver devices 110A-110N, e.g. listening devices 110A-110N, embodiments of sound verification are in no way limited to such quantity.

System 100 may represent a sound verification system that includes a primary transceiver device 105, e.g., a speaker device, which may be configured to transmit sound at a dynamic volume level, and a secondary transceiver device 110 e.g., a listening device, that may be configured to receive the sound and provide feedback to the speaker device based on the received sound. The primary transceiver device may be further configured to adjust the dynamic volume level based on the feedback provided by the secondary transceiver device.

Alternatively, system 100 may be a sound verification system that includes a primary transceiver device 105, e.g., a speaker device, which may be configured to transmit sound signals and convert the sound signals into a primary text version of the transmitted sound signals. The sound verification system may also include a secondary transceiver device 110 e.g., a listening device, that may be configured to receive the sound signals transmitted by the primary transceiver device, convert the received sound signals into a secondary text version of the received sound signals, and transmit the secondary text version of the received sound signals to the primary transceiver device.

Speaker device 105 may refer to an electro-mechanical transceiver device that may be configured to produce sound in response to electrical audio input signals, and to transmit the produced sound at dynamic volume level. Speaker device 105 may produce sound by converting electrical signals into audible signals. As referenced herein, a dynamic volume level may refer to a volume level that is either automatically or manually adjustable. As non-limiting examples, embodiments of speaker device 105 may be used to produce and/or transmit audible representations of songs, public announcements, speeches, lectures, discussions, etc., in various public and private forums such as schools, classrooms, offices, conference rooms, lecture halls, theaters, arenas, stadiums, airports, airplanes, train stations, trains, bus terminals, busses, sidewalks, etc. One or more of the aforementioned non-limiting examples of speaker device 105 may be affixed to a structure. Alternatively, speaker device 105 may be portable, and therefore additional non-limiting examples of speaker device 105 may be hand-held, externally and temporarily affixed to a vehicle, temporarily placed in a room, etc. Non-limiting examples of speaker devices 105 may include audio speakers for classrooms, conference rooms, theaters, auditoriums, etc., used to transmit sound in one or more of the above-listed public and private forums. Alternatively, further non-limiting examples of speaker device may 105 may include cell phones, smartphones, tablet computers, laptop computers, or any other device capable of transmitting sound in one or more of the above-listed forums.

Speaker device 105 may be further configured to convert the produced sound to text. That is, for embodiments of sound verification, speaker device 105 may be capable of converting locally produced sounds into a text representation thereof. The produced sounds may be audio representations of words, which may be spoken, whispered, rapped, sung, chanted, etc. To generate an accurate audio-to-text conversion, speaker device 105 may be equipped with at least a receiver, e.g., a microphone, configured to capture the locally produced sound, and a converter configured to convert the captured sound into text. The audio-to-text conversion may be executed by speaker device 105 or, alternatively, by a conversion device that is external to speaker device 105. The present description will refer to the audio-to-text conversion being executed by speaker device 105, although alternative embodiments of sound verification are not limited to such configuration. Further, as will be described below, the converter may be implemented as a software component, a hardware feature, or a combination thereof.

Speaker device 105 may still further be configured to compare the text representation of the produced sound converted at speaker device 105 to other text representations of the same produced sound. The other text representations of the same produced sound may be converted at one or more of secondary transceiver devices 110 e.g., listening devices, which may be configured to execute similar audio-to-text conversions as speaker device 105; and the text representations generated by listening devices 110 may be transmitted to speaker device 105, as will be described further below.

Results of the comparisons of the text representations of the produced sound, respectively converted by speaker device 105 and one or more of listening devices 110, may influence a dynamic adjustment of the volume for continued transmission of sound produced by speaker device 105. The dynamic adjustment of sound transmitted from speaker device 105 may be manually or automatically executed.

Listening devices 110 may each respectively refer to electro-mechanical transceiver devices that may be configured to receive the sound transmitted by speaker device 105, and to provide feedback to verify the quality, e.g., volume, of the received sound. Embodiments of listening devices 110 may be hand-held, portable, and/or affixed in various public and private forums such as schools, classrooms, offices, conference rooms, lecture halls, theaters, arenas, stadiums, airports, airplanes, train stations, trains, bus terminals, busses, sidewalks, etc. One or more of the aforementioned non-limiting examples of listening device 110 may be affixed to a structure. Non-limiting examples of listening devices 110 may include cell phones, smartphones, tablet computers, laptop computers, specialized listening devices, e.g., individual headsets used for museum tours, headphones, etc.

Listening devices 110 may be configured to convert the produced sound received from speaker device 105 into a text representation thereof. To generate an accurate audio-to-text conversion, listening devices 110 may be equipped with at least a receiver, e.g., a microphone, configured to capture at least portions of the produced sound received from speaker device 105, which may then be converted into a text representation.

Listening devices 110 may also be configured to transmit the text representation of the produced sound to speaker device 105, as will be described further below, by various protocols including, but not limited to, text message (via short-messaging-service (SMS)), Bluetooth, email, etc. Results of the comparisons of text representations of the produced sound, respectively converted by speaker device 105 and one or more of listening devices 110, may influence a dynamic adjustment of the volume at which sound produced by speaker device 105 is transmitted.

Figure 2:
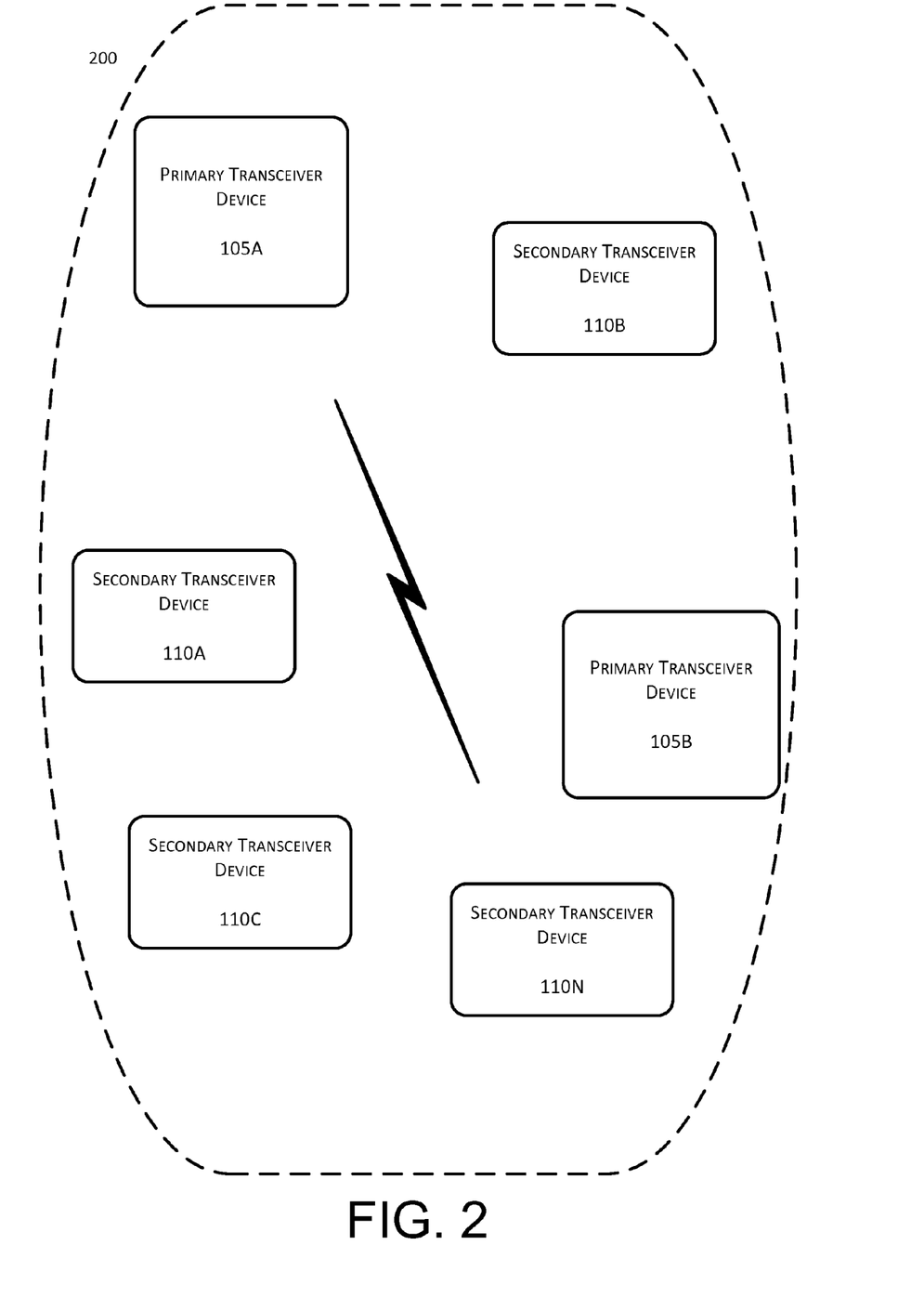
FIG. 2 shows another example configuration of a system by which sound verification may be implemented, arranged in accordance with at least some embodiments described herein.

FIG. 2 shows another example configuration of a system 200 by which sound verification may be implemented, arranged in accordance with at least some embodiments described herein. Similar to system 100 described above with regard to FIG. 1, non-limiting examples of system 200 may be configured in a conference room, an auditorium, a theater, an indoor arena, an outdoor stadium, a public square or forum, a college or corporate campus, a museum, a parade route, etc. FIG. 2 shows primary transceiver devices 105A and 105B, e.g., speaker device 105A and 105B, as well as listening devices 110. Unless context of a corresponding description requires specific reference to one or more of speaker devices 105A and 105B, individual reference may be made to representative "speaker device 105" and corporate reference may be made to collective "speaker devices 105." Further, although FIG. 2 shows two representations of speaker devices 105A and 105B, embodiments of sound verification are in no way limited to such quantity.

System 200 may be a sound verification system that includes multiple primary transceiver devices, e.g., speaker devices that may each be configured to transmit sound at a dynamic volume level, and one or more secondary transceiver devices, e.g., listening devices that may each be configured to receive the sound and provide feedback to at least one of the primary transceiver devices, e.g., the speaker devices based on the received sound. The primary transceiver devices, e.g., speaker devices may be further configured to adjust the dynamic volume level based on the feedback provided by the one or more secondary transceiver devices, e.g., listening devices.

Alternatively, system 200 may be a sound verification system that includes multiple primary transceiver devices, e.g., speaker devices that may each be configured to transmit sound signals and convert the sound signals into a primary text version of the transmitted sound signals. The sound verification system may also include one or more secondary transceiver devices, e.g., listening devices that may be configured to receive the sound signals transmitted by the primary transceiver devices, e.g., speaker devices, convert the received sound signals into a secondary text version of the received sound signals, and transmit the secondary text version of the received sound signals to at least one of the primary transceiver devices, e.g., speaker devices.

Speaker devices 105A and 105B represent multiple embodiments of speaker device 105, which is described above with regard to FIG. 1. Thus, as described above with regard to FIG. 1, speaker devices 105 may be primary transceiver devices configured to transmit sound at dynamic volume level by producing sound in response to electrical audio signal input. Further, speaker devices 105 may be configured to convert the produced sound to a text representation thereof. Further still, speaker device 105 may be configured to compare the text representation of the produced sound converted at speaker device 105 to other text representations of the same produced sound.

Listening devices 110 are the same as described above with regard to FIG. 1. However, in system 200, listening devices 110 may be secondary transceiver devices configured to receive sound transmitted by one or more embodiments of speaker devices 105, and provide feedback to verify the quality, e.g., volume, of the received sound to at least one of speaker devices 105.

Because, for example, listening device 110A is unlikely to receive produced sound transmitted from speaker device 105A at the same time as it receives produced sound transmitted from speaker device 105B, depending on the respective proximity of listening device 110A to speaker device 105A and speaker device 105B, listening devices 110 may be further configured to distinguish produced sound received from respective embodiments of speaker devices 105. That is, listening devices 110 may be configured to distinguish sound received from different sources due to latencies caused by the speed at which sound travels, reverberations in sound waves, etc.

As described above with regard to FIG. 1, listening devices 110 may be configured to convert the produced sound received from speaker device 105 into text representations thereof. To distinguish the produced sound transmitted from speaker device 105A from the produced sound transmitted from speaker device 105B, the receiver, e.g., a microphone, corresponding to listening device 110 may be configured to capture sound, for transmittal to the converter (described below), received at either of a same volume or a same frequency. Thus, listening device 110 may distinguish sound from different sources.

As described above with regard to FIG. 1, listening devices 110 may be configured to provide feedback to verify the quality, e.g., volume, of the received sound to one or more of speaker devices 105, by various protocols including, but not limited to, text message (via SMS), Bluetooth, email, etc. Results of the comparisons of text representations of the produced sound, respectively converted by speaker device 105 and one or more of listening devices 110, may influence a dynamic adjustment of the volume at which sound produced by speaker device 105 is transmitted.

Figure 3:
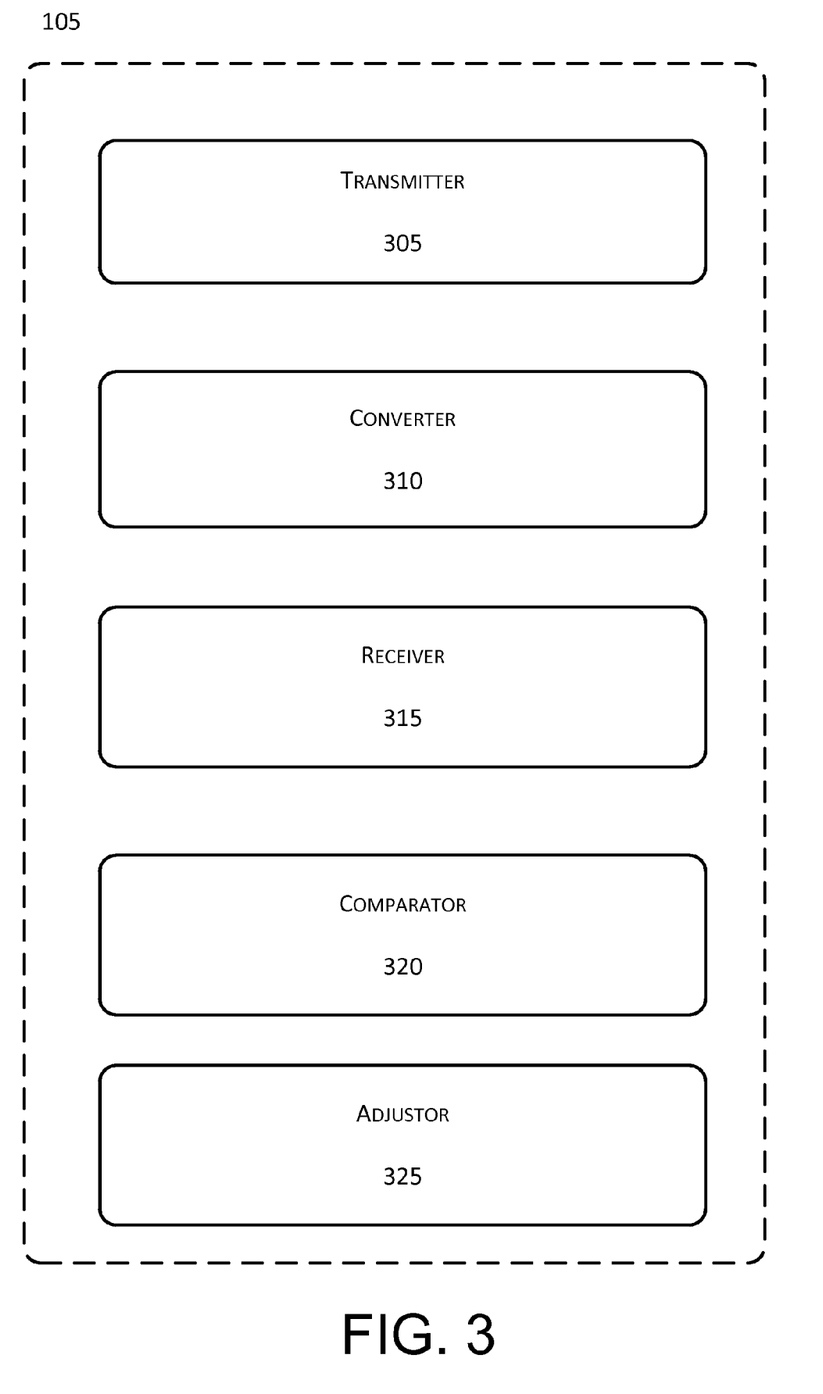
FIG. 3 shows an example configuration of a speaker device by which sound verification may be implemented, arranged in accordance with at least some embodiments described herein.

FIG. 3 shows an example configuration of primary transceiver device 105 by which sound verification may be implemented, arranged in accordance with at least some embodiments described herein. As illustrated in FIG. 3, primary transceiver device 105 may correspond to speaker device 105 shown in, and described with regard to, FIGS. 1 and 2. As depicted, primary transceiver device 105 may be configured to include a transmitter 305, a converter 310, a receiver 315, a comparator 320, and an adjustor 325. In accordance with the embodiments described herein, primary transceiver device 105 and the components thereof shown in FIG. 3 may be implemented as hardware, software, firmware, or any combination thereof. Further, it will be readily understood that the components of primary transceiver device 105, as generally described herein and illustrated in FIG. 3, may be arranged, substituted, combined, separated, and designed in a wide variety of different configurations, all of which are explicitly contemplated herein.

Transmitter 305 may represent a component or module configured to produce or generate sound in response to electrical audio input signals, and to transmit the produced sound at dynamic volume level. That is, transmitter 305 may function as an audio transmitter.

Converter 310 may represent a component or module configured to convert words included in the produced sound, transmitted by transmitter 305, into a localized text representation. Converter 310 may convert sounds captured by, e.g., a microphone, corresponding to primary transceiver device 105 that is configured to capture or receive the locally produced sound. The words included in the produced sound may be spoken, whispered, rapped, sung, chanted, etc. Further, converter 310 may produce a sound-to-text conversion of the transmitted sound using known conversion applications. Further still, converter 310 may be implemented for multiple languages.

Alternative embodiments of converter 310 may be configured to directly convert sound from an MP3, MP4, or other digital recording format into a text representation thereof. Similarly, converter 310 may be configured to directly convert sounds, e.g., words, from any digitally streamed media content into a text representation, either before, during, or after the sounds are transmitted by transmitter 305.

The localized text representation of words included in the produced sound, transmitted by transmitter 305, may be stored in a local or remote storage component. When stored, the localized text representation may be divided into one or more samples. Non-limiting examples of parameters for such samples may include a particular number of words, e.g., 25 words; words spoken over a predetermined period of time, e.g., every 30 seconds; or words spoken at a specified time period, e.g., from 04:10:15 to 04:10:45. Regardless of how the sampling sizes are determined, converter 310 may attach metadata to the tag to the respective samples to indicate parameters of the sample.

Receiver 315 may represent a component or module configured to receive text representations of the produced sounds converted at one or more receiving transceiver devices, which may be configured to execute similar audio-to-text conversions as primary transceiver 105. The received text representations may be received by various protocols including, but not limited to, text message (via SMS), Bluetooth, email, etc. The received text representations may be similarly sampled as the localized text representations. Thus, as non-limiting examples, the received text representations may be tagged with metadata to indicate parameters thereof including, but not limited to, a particular number of words, words spoken over a predetermined period of time, or words spoken at a specified time period.

Comparator 320 may represent a component or module configured to compare samples of the localized text representation to similar samples of one or more received text representations of the transmitted produced sound that are received from one or more listening devices 110. To perform the comparisons, comparator 320 may regard the samples of the localized text representation as the most accurate representations of the transmitted produced sound. Thus, the result of any comparison between a sample of the localized text representation and to a sample of a received text representation of the transmitted produced sound may include a score that indicates a number of errors per sample. In accordance with the example embodiment described above with regard to FIG. 2, the per-sample scores may be recorded with respect to listening devices 110 from which the respective samples of the received text representations are received.

Adjustor 325 may represent a component or module configured to determine whether the dynamic volume level at which the produced sound is transmitted from transmitter 305 should remain the same or be increased. Such determination may be made based on the scores determined by comparator 320. Various embodiments of sound verification may include different thresholds by which a determination is made to increase the dynamic volume level. As non-limiting examples, a determination to increase the volume may be made if 5 errors were recorded in a sampling of the most recent 25 words, if 7 errors were recorded over the past 30 seconds, or if 3 errors were recorded between 04:10:15 to 04:10:45. Above-threshold scores may be indicative of poor sound transmission quality, e.g., low volume; and a prescribed solution may be to increase the dynamic volume at which the produced sound is transmitted from transmitter 305. Scores that are below the threshold may be indicative of sufficient or acceptable sound transmission quality, and therefore the dynamic volume at which the produced sound is transmitted from transmitter 305 may remain the same.

In accordance with the example embodiment described above with regard to FIG. 2, when comparator 320 compares one or more samples of the localized text representation of the transmitted sound to corresponding samples received from more than one of listening devices 110, adjustor 325 may adjust the dynamic volume level to accommodate a respective one of listening devices 110 having a score that represents a highest number of errors per sample, a lowest number of errors per sample, or an average number of errors per sample.

As described above, the actual adjusting of the dynamic volume level by which produced sounds are transmitted by transmitter 305 may be performed automatically or manually.

In one or more alternative embodiments of primary transceiver device 105, one or more of components 305, 310, 315, 320, and 325 may be combined, eliminated, or even separated into one or more different devices, depending on the desired implementation.

For example, comparator 320 and adjustor 325 may be hosted on an application or program that is configured to execute on a separate device. Non-limiting examples of such a separate device may include cell phones, smartphones, tablet computers, laptop computers, or any other device capable of transmitting volume adjusting instructions to primary transceiver device 105 by various protocols including, but not limited to, text message (via SMS), Bluetooth, email, etc.

Figure 4:
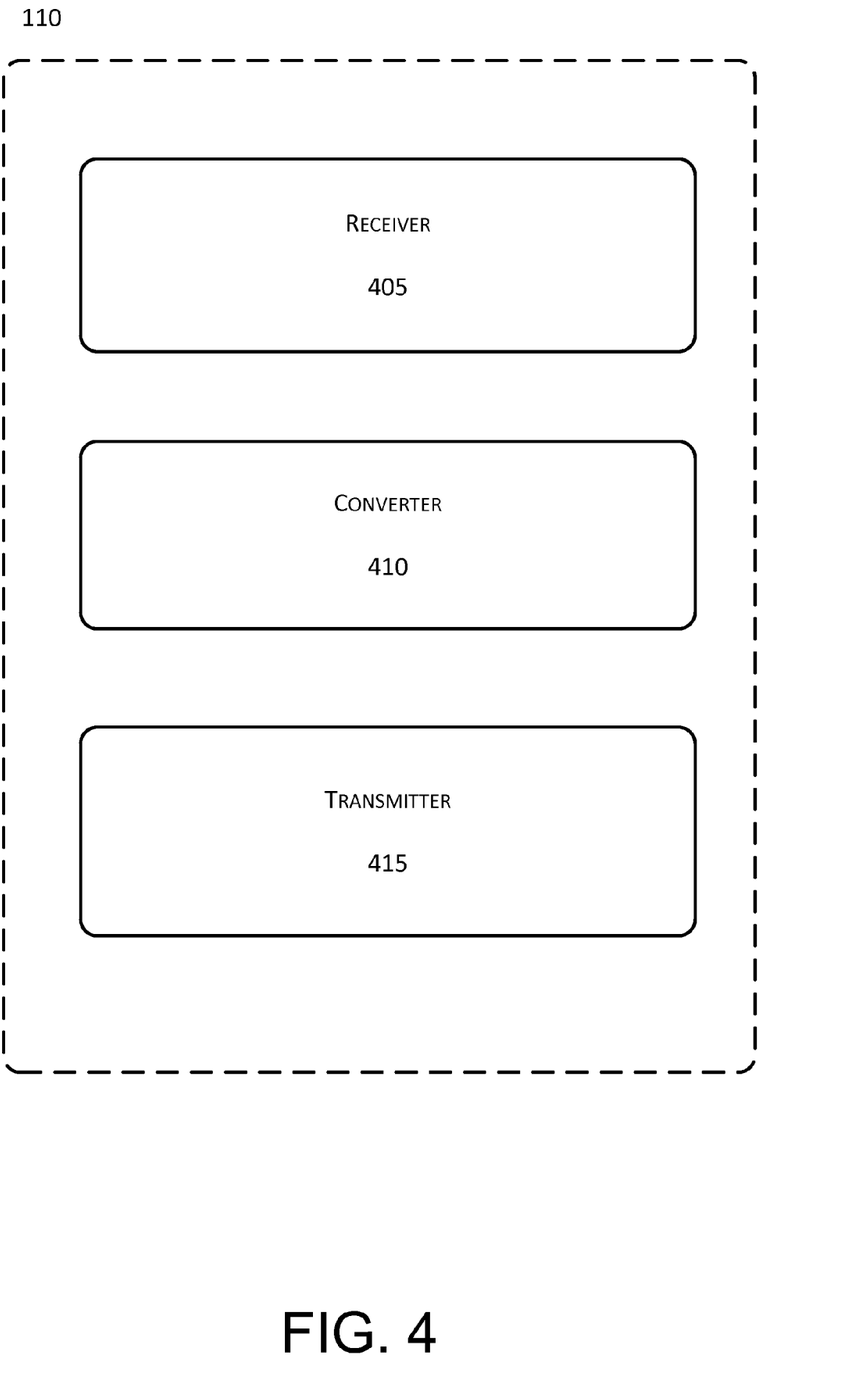
FIG. 4 shows an example configuration of a listening device by which sound verification may be implemented, arranged in accordance with at least some embodiments described herein.

FIG. 4 shows an example configuration of secondary transceiver device 110 by which sound verification may be implemented, arranged in accordance with at least some embodiments described herein. As illustrated in FIG. 4, secondary transceiver device 110 may correspond to listening device 110 shown in, and described with regard to, FIGS. 1 and 2. As depicted, secondary transceiver device 110 may be configured to include a receiver 405, a converter 410, and a transmitter 415. In accordance with the embodiments described herein, secondary transceiver device 110 and the components thereof shown in FIG. 4 may be implemented as hardware, software, firmware, or any combination thereof. Further, it will be readily understood that the components of secondary transceiver device 110, as generally described herein and illustrated in FIG. 4, may be arranged, substituted, combined, separated, and designed in a wide variety of different configurations, all of which are explicitly contemplated herein.

Receiver 405 may represent a component or module configured to receive sounds transmitted from primary transceiver device 105. Receiver 405 may capture sounds using, e.g., a microphone, corresponding to secondary transceiver device 110.

Converter 410 may represent a component or module configured to convert words included in the received sound, received by receiver 405, into a text representation thereof. The sound received by receiver 405 may or may not be a sound transmitted by primary transceiver device 105. The words included in the received sound may be spoken, whispered, rapped, sung, chanted, etc., and the sound-to-text conversion may be executed using known conversion applications.

The converted text representations of the received sound may be divided into one or more samples. Non-limiting examples of parameters for such samples may include a particular number of words, e.g., 25 words; words spoken over a predetermined period of time, e.g., every 30 seconds; or words spoken at a specified time period, e.g., from 04:10:15 to 04:10:45. Regardless of how the sampling sizes are determined, converter 410 may attach metadata to tag the respective samples to indicate parameters of the sample.

Transmitter 415 may represent a component or module configured to transmit one or more of the samples of the converted text representations of the received sound to primary transceiver device 105 by various protocols including, but not limited to, text message (via SMS), Bluetooth, email, etc. As described above with regard to FIG. 3, the text representation samples transmitted by transmitter 415 may be compared to corresponding text representations samples produced by primary transceiver device 105. The results of such comparisons may determine whether the dynamic volume level at which produced sound is transmitted from primary transceiver device 105 is to remain the same or be increased.

In or more alternative embodiments of secondary transceiver device 110, one or more of components 405, 410, and 415 may be combined, eliminated, or even separated into one or more different devices, depending on the desired implementation.

Figure 5:
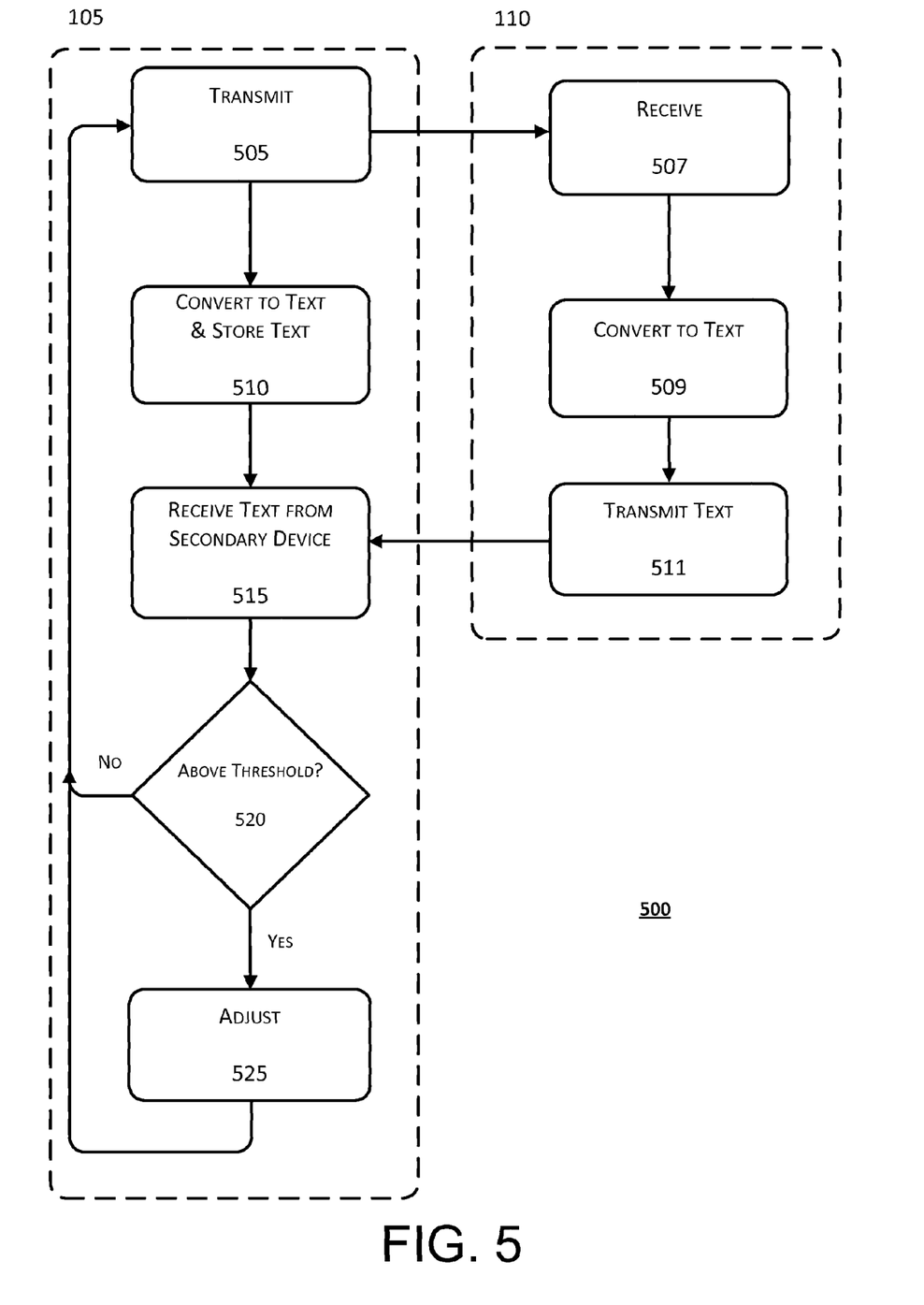
FIG. 5 shows an example processing flow by which at least some variations of sound verification may be implemented, arranged in accordance with at least some embodiments described herein.

FIG. 5 shows an example processing flow 500 by which at least some variations of sound verification may be implemented, arranged in accordance with at least some embodiments described herein.

Processing flow 500 may refer in part to a method, performed by primary transceiver device 105, to verify audio transmission, that includes: transmitting audio signals at an initial volume; converting the audio signals into a source text; receiving, respectively from one or more of secondary transceiver devices 110, secondary text converted from the transmitted audio signals; comparing the source text to the secondary text received from each of the one or more secondary transceiver devices; and adjusting a volume applied to the transmitting based on a result of the comparison.

Alternatively, processing flow may refer to a method to verify audio transmission, that includes: transmitting media signals; storing a text version of the media signals; receiving, respectively from one or more of secondary transceiver devices 110, secondary text converted from the transmitted media signals; comparing the stored text version of the media signals to the secondary text received from each of the one or more secondary transceiver devices; and adjusting an intensity applied to a continued transmitting of the media signals based on a comparison result.

Processing flow 500 may include one or more operations, actions, or functions depicted by one or more blocks 505, 507, 509, 510, 511, 515, 520, and 525. Further, the operations, actions, or functions depicted by blocks 505, 510, 515, 520, and 525 may be attributed to primary transceiver device 105 described above with regard to FIGS. 1, 2, and 3; and the operations, actions, or functions depicted by blocks 507, 509, and 511 may be attributed to secondary transceiver device 110 described above with regard to FIGS. 1, 2, and 4. Although illustrated as discrete blocks, various blocks may be performed sequentially, performed in parallel, divided into additional blocks, combined into fewer blocks, or eliminated, depending on the desired implementation. Processing may begin at block 505.

Block 505 (Transmit) may refer to transmitter 305 corresponding to primary transceiver device 105 producing sound in response to electrical audio input signals and transmitting the produced sound at a dynamic volume level. The transmitted sounds may include words that may be spoken, whispered, rapped, sung, chanted, etc. Block 505 may be followed by block 510 at primary transceiver device 105; and block 505 may be followed by block 507 at secondary transceiver device 110.

Block 507 (Receive) may refer to receiver 405 corresponding to secondary transceiver device 110 receiving the produced sounds transmitted from transmitter 305 corresponding to at least one embodiment of primary transceiver device 105. Block 507 may be followed by block 509 at secondary transceiver device 110.

Block 509 (Convert to Text) may refer to converter 410 corresponding to secondary transceiver device 110 converting words included in the received sound, transmitted by primary transceiver device 105, into a text representation thereof. The words included in the received sound may be spoken, whispered, rapped, sung, chanted, etc., and the sound-to-text conversion may be executed using known conversion applications. Further, the converted text representations of the received sound may be divided into one or more samples. Non-limiting examples of parameters for such samples may include a particular number of words, words spoken over a predetermined period of time, or words spoken at a specified time period. Block 509 may further include metadata being attached to tag the respective samples to indicate parameters of the sample. Block 509 may be followed by block 511 at secondary transceiver device 110.

Block 510 (Convert to Text & Store Text) may refer to converter 310 corresponding to primary transceiver device 105 converting words included in the produced sound, transmitted by transmitter 305, into a localized text representation thereof. The words included in the produced sound may be spoken, whispered, rapped, sung, chanted, etc. Block 510 may be executed using known conversion applications. The localized text representation of words included in the produced sound may be stored in a local or remote storage component. When stored, the localized text representation may be divided into one or more samples. Non-limiting examples of parameters for such samples may include a particular number of words, words spoken over a predetermined period of time, or words spoken at a specified time period. Block 510 may further include metadata being attached to tag the respective samples to indicate parameters of the sample. Block 510 may be followed by block 515 at primary transceiver device 105.

Block 511 (Transmit Text) may refer to transmitter 415 corresponding to secondary transceiver device 110 transmitting one or more of the samples of the converted text representations of the received sound to primary transceiver device 105. Block 511 may be followed by block 515 at primary transceiver device 105.

Block 515 (Receive Text From Secondary Device) may refer to receiver 315 corresponding to primary transceiver device 105 text representations of the produced sounds converted at one or more receiving transceiver devices, which may be configured to execute similar audio-to-text conversions as primary transceiver 105.

The received text representations may be similarly sampled as the localized text representations. Thus, as non-limiting examples, the received text representations may be tagged with metadata to indicate parameters thereof including, but not limited to, a particular number of words, words spoken over a predetermined period of time, or words spoken at a specified time period. Accordingly, block 515 may further refer to receiver 315 and/or comparator 320 corresponding to primary transceiver device 105 matching samples of the localized text representations to samples of the received text representations, based on at least the metadata used to tag the respective samples. Block 515 may be followed by decision block 520 at primary transceiver device 105.

Decision block 520 may refer to comparator corresponding to primary transceiver device 105 comparing samples of the localized text representation to samples of one or more received text representations of the transmitted produced sound that are received from one or more receiving transceiver devices. The samples of the localized text representation are matched, for the purpose of being compared, to the samples of the received text representations based on at least the metadata used to tag the respective samples. The result of any comparison between a sample of the localized text representation and to a sample of a received text representation of the transmitted produced sound may include a score that indicates a number of errors per sample. Various embodiments of sound verification may include different thresholds by which a determination is made to increase the dynamic volume level. As non-limiting examples, a determination to increase the volume may be made if 5 errors were recorded in a sampling of the most recent 25 words, if 7 errors were recorded over the past 30 seconds, or if 3 errors were recorded between 04:10:15 to 04:10:45.

A positive determination, i.e., yes, at decision block 520, may be followed by block 525 at primary transceiver device 105. A negative determination, i.e., no, at decision block 520, may advance processing flow 500 back to block 505. That is, if the comparison results in a number of errors per sample that falls within an acceptable range, e.g., below the threshold level, a determination may be made that the volume of sound transmission from transmission 305 is sufficient for the embodiment of secondary transceiver device 110 from which the received text representation sample was received.

Block 525 (Adjust) may refer to adjustor 325 corresponding to primary transceiver device 105 determining that the dynamic volume level at which the produced sound is transmitted from primary transceiver device 105 should be increased based on the scores determined by comparator 320. Various embodiments of sound verification may include different thresholds by which a determination is made to increase the dynamic volume level. Thus, when the comparison results in a number of errors per sample that exceeds an acceptable threshold level, a determination may be made that the volume of sound transmission from transmitter 305 should be increased because the produced sound is not being heard clearly at the embodiment of secondary transceiver device 110 from which the received text representation sample was received.

Figure 6:
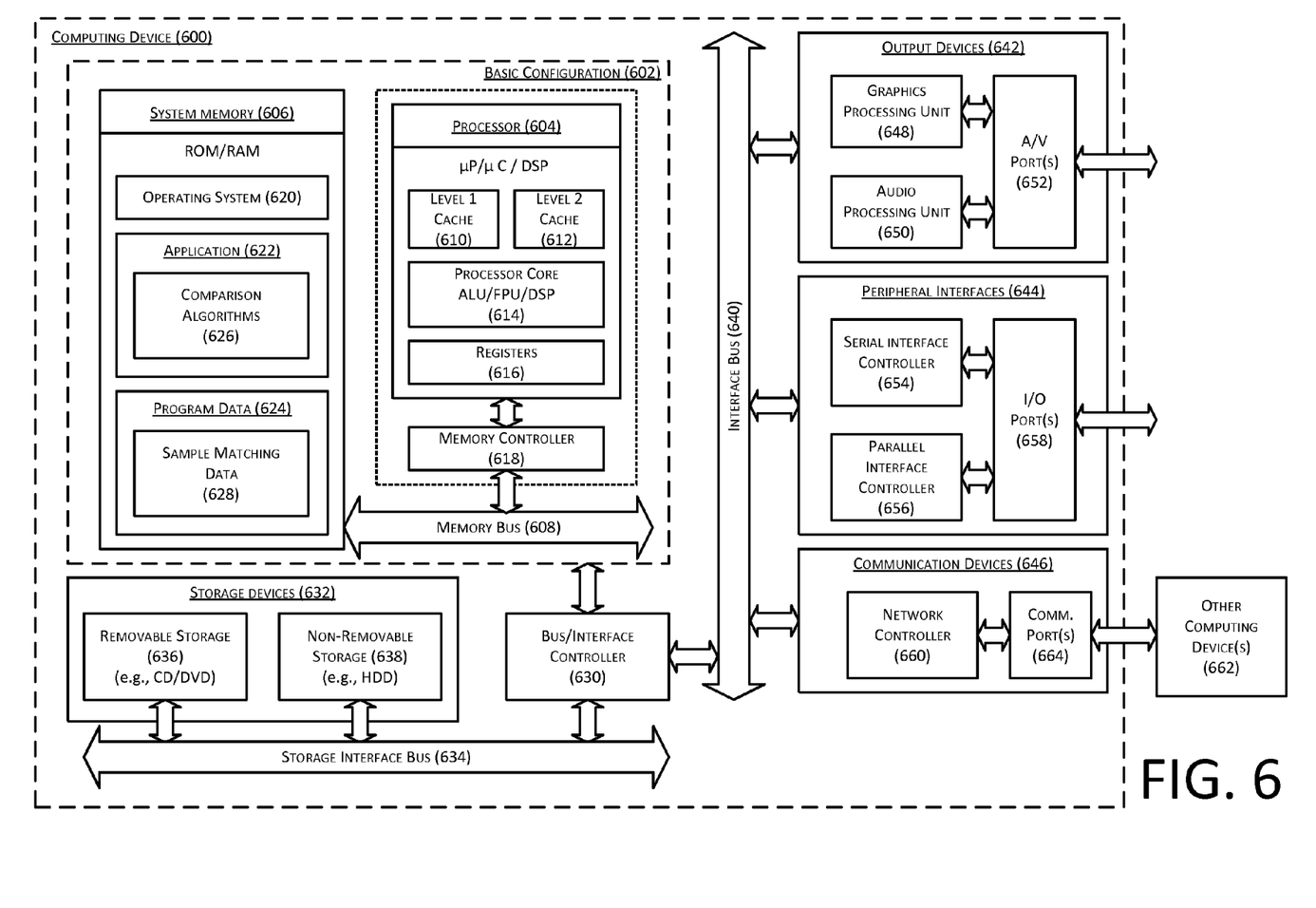
FIG. 6 shows a block diagram illustrating an example computing device by which various example solutions described herein may be implemented, arranged in accordance with at least some embodiments described herein.

FIG. 6 shows a block diagram illustrating an example computing device by which various example solutions described herein may be implemented, arranged in accordance with at least some embodiments described herein.

In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations, memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include one or more comparison algorithms 626 that may be arranged to perform the functions as described herein including those described with respect to processing flow 500 of FIG. 5. Program data 624 may include sample matching data 628 that may be utilized for matching samples of the localized text representations and received text representations for execution of the comparison algorithm 626 as described herein. Sample matching data 628 may include data for matching received sample in accordance with metadata that may include parameters described above with regard to FIGS. 1-4, as well as volume and frequency matching. In some embodiments, application 622 may be arranged to operate with program data 624 on operating system 620 such that samples may be matched and accurate comparisons may be provided, as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a server or a personal computer including both laptop computer and non-laptop computer configurations.

According to some examples, a sound verification system may include a speaker device and a listening device. The speaker device may be configured to transmit sound at a dynamic volume level. The listening device may be configured to receive the sound and provide feedback to the speaker device based on the received sound, wherein the speaker device may be further configured to adjust the dynamic volume level based on the feedback provided by the listening device.

In other examples of the sound verification system, the feedback provided by the listening device to the speaker device may be a sound-to-text conversion of the received sound.

In still other examples of the sound verification system, the speaker device may be further configured to convert the transmitted sound to a localized text version of the transmitted sound, and to adjust the dynamic volume level based on a comparison of the localized text version of the transmitted sound to the sound-to-text version of the received sound provided by the listening device.

According to various examples, a sound verification system may include a primary transceiver device and a secondary transceiver device. The primary transceiver device may be configured to transmit sound signals, and convert the sound signals into a primary text version of the transmitted sound signals. The secondary transceiver device may be configured to receive the sound signals transmitted by the primary transceiver device, convert the received sound signals into a secondary text version of the received sound signals, and transmit the secondary text version of the received sound signals to the primary transceiver device.

In other examples of the sound verification system, the primary transceiver device may be configured to receive the secondary text version of the received sound signals from the secondary transceiver device, grade a level of accuracy of a comparison of the primary text version of the transmitted sound signals relative to the secondary text version of the received sound signals, and adjust a volume level based on the grade as transmission of sound signals continues.

According to some examples, a method to verify audio transmission by a computing device may include transmitting audio signals at an initial volume; converting the audio signals into a source text, receiving; respectively from one or more secondary devices, secondary text converted from the transmitted audio signals; comparing the source text to the secondary text received from each of the one or more secondary devices; and adjusting a volume applied to the transmitting based on a result of the comparing.

In some examples, the method to verify audio transmission by a computing device may be repeated periodically.

In still other examples, the method to verify audio transmission by a computing device may be repeated periodically by multiple primary devices.

In further examples, in the method to verify audio transmission by a computing device, the comparing may include assigning a score to a comparison between the source text to the secondary text received from a respective one of the secondary devices, and the adjusting may include increasing the volume in response to one of the scores being less than a threshold value.

In some examples, in the method to verify audio transmission by a computing device, the comparing may include assigning a score to a comparison between the source text to the secondary text received from a respective one of the secondary devices, and the adjusting may include increasing the volume in response to the majority of the scores being less than a threshold value.

In various examples, in the method to verify audio transmission by a computing device, the comparing may include assigning a score to a comparison between the source text to the secondary text received from a respective one of the secondary devices, and the adjusting may include decreasing the volume in response to the majority of the scores being greater than a threshold value.

In some examples, a non-transitory computer-readable medium may be configured to store instructions. The instructions, when executed, may cause one or more processors to transmit media signals; store a text version of the media signals; receive, respectively from one or more secondary devices, secondary text converted from the transmitted media signals; compare the stored text version of the media signals to the secondary text received from each of the one or more secondary devices; and adjust an intensity applied to a continued transmitting of the media signals based on a comparison result.

In other examples, the media signals include audio signals, and the adjusting may include adjusting a dynamic volume applied to the continued transmitting of the audio signals based on the comparison result; or the adjusting may include accommodating a majority of values of the comparison result, relative to a threshold value.

In still other examples, the one or more processors may be configured to periodically repeat execution of the instructions.

In further examples, the one or more processors may be configured to periodically repeat execution of the instructions in concert with the one or more processors of one or more other devices.

In still further examples, the adjusting includes accommodating a lowest value of the comparison result or accommodating a highest value of the comparison result.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium, e.g., a fiber optic cable, a waveguide, a wired communication link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing location and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A sound verification system, comprising:
   a speaker device configured to transmit sound at a dynamic volume level; and
   a listening device configured to receive the sound and provide feedback to the speaker device based on the received sound, wherein the feedback provided is a sound-to-text conversion of the received sound, and
   wherein the speaker device is further configured to control the dynamic volume level for the speaker device based on the feedback provided by the listening device.

2. The sound verification system of claim 1,
   wherein the speaker device is further configured to:
   convert the transmitted sound to a localized text version of the transmitted sound, and
   adjust the dynamic volume level based on a comparison of the localized text version of the transmitted sound to a sound-to-text version of the received sound provided by the listening device.

3. A sound verification system, comprising:
   a primary transceiver device configured to:
   transmit sound signals; and
   convert the sound signals into a primary text version of the transmitted sound signals; and
   a secondary transceiver device configured to:
   receive the sound signals transmitted by the primary transceiver device;
   convert the received sound signals into a secondary text version of the received sound signals; and
   transmit the secondary text version of the received sound signals to the primary transceiver device.

4. The sound verification system of claim 3, wherein the primary transceiver device is further configured to:
   receive the secondary text version of the received sound signals from the secondary transceiver device;
   grade a level of accuracy of a comparison of the primary text version of the transmitted sound signals relative to the secondary text version of the received sound signals; and
   adjust a volume level based on the grade as transmission of sound signals continues.

5. A method to verify audio transmission, comprising, by a primary device:
   transmitting audio signals at an initial volume;
   converting the audio signals into a source text;
   receiving, respectively from one or more secondary devices, secondary text converted from the transmitted audio signals;
   comparing the source text to the secondary text received from each of the one or more secondary devices; and
   adjusting a volume applied to the transmission based on a result of the comparison.

6. The method of claim 5, wherein the method is repeated periodically.

7. The method of claim 5, wherein the method is repeated periodically by multiple primary devices.

8. The method of claim 5,
   wherein the comparing includes assigning a score to a comparison between the source text and the secondary text received from a respective one of the one or more secondary devices, and
   wherein, further, the adjusting includes increasing the volume in response to one of the scores being less than a threshold value.

9. The method of claim 5,
wherein the comparing includes assigning a score to a comparison between the source text and the secondary text received from a respective one of the one or more secondary devices, and
wherein, further, the adjusting includes decreasing the volume in response to one of the scores being greater than a threshold value.

10. The method of claim 5,
wherein the comparing includes assigning a score to a comparison between the source text and the secondary text received from a respective one of the one or more secondary devices, and
wherein, further, the adjusting includes increasing the volume in response to a majority of the scores being less than a threshold value.

11. The method of claim 5,
wherein the comparing includes assigning a score to a comparison between the source text and the secondary text received from a respective one of the one or more secondary devices, and
wherein, further, the adjusting includes decreasing the volume in response to a majority of the scores being greater than a threshold value.

12. A non-transitory computer-readable medium configured to store instructions that, when executed, cause one or more processors to:
transmit media signals;
store a text version of the media signals;
receive, respectively from one or more secondary devices, secondary text converted from the transmitted media signals;
compare the stored text version of the media signals to the secondary text received from each of the one or more secondary devices; and
adjust an intensity applied to a continued transmission of the media signals based on a comparison result.

13. The non-transitory computer-readable medium of claim 12,
wherein the media signals comprise audio signals, and
wherein the adjusting comprises adjusting a dynamic volume applied to the continued transmission of the audio signals based on the comparison result.

14. The non-transitory computer-readable medium of claim 12, wherein the one or more processors are configured to periodically repeat execution of the instructions.

15. The non-transitory computer-readable medium of claim 12, wherein the one or more processors are configured to periodically repeat execution of the instructions in concert with one or more processors of one or more other devices.

16. The non-transitory computer-readable medium of claim 12, wherein the adjusting is to accommodate a lowest value of the comparison result.

17. The non-transitory computer-readable medium of claim 12, wherein the adjusting is to accommodate a highest value of the comparison result.

18. The non-transitory computer-readable medium of claim 12, wherein the adjusting is to accommodate a majority of values of the comparison result, relative to a threshold value.

* * * * *